United States Patent [19]

Herzog

[11] Patent Number: 4,995,781

[45] Date of Patent: Feb. 26, 1991

[54] MOVABLE AUXILIARY HOPPER

[76] Inventor: Kenneth J. Herzog, 7 Westerly Ct., Hampton Bays, N.Y. 11946

[21] Appl. No.: 431,329

[22] Filed: Nov. 3, 1989

[51] Int. Cl.[5] .............................................. B65G 69/00
[52] U.S. Cl. ..................................... 414/680; 222/166; 53/314; 414/917
[58] Field of Search ................. 222/165, 166; 53/314, 53/315, 316; 414/222, 224, 422, 680, 683, 685, 917, 697, 706, 710

[56] References Cited

U.S. PATENT DOCUMENTS

| | | | |
|---|---|---|---|
| 1,986,864 | 1/1935 | Tolley | 222/166 |
| 4,483,650 | 11/1984 | Sims | 222/166 X |
| 4,599,035 | 7/1986 | Goodlad et al. | 414/917 X |
| 4,824,315 | 9/1989 | Naab et al. | 414/422 X |

FOREIGN PATENT DOCUMENTS 246304  1/1911  Fed. Rep. of Germany ...... 222/166

*Primary Examiner*—Robert J. Spar
*Assistant Examiner*—James T. Eller
*Attorney, Agent, or Firm*—Hopgood, Calimafde, Kalil, Blaustein & Judlowe

[57] ABSTRACT

A movably mounted auxiliary hopper and a platform therefor are provided for discharging small articles contained in the container to a cooperably associated dispensing hopper mounted on the platform, the dispensing hopper being adapted to feed articles in an oriented position to a cooperably associated chute directed to a receiving station. The auxiliary hopper comprises a container having bottom, side and end walls and an open top for receiving a charge of small articles therein, the container being adapted to provide gravity flow of the articles to a discharge end of the container. A U-shaped trough extends from the discharge end of the container and which communicates with the interior of the container. A pair of legs is pivotally mounted to one side of the container and a complementary pair pivotally mounted on the other side thereof, the legs of the container extending to and being pivotally connected to the platform, such that the container forming the movable auxiliary hopper is capable of being moved to an upper position for discharging articles to the dispensing hopper and to a lower accessible position for charging articles to or to remove residual articles from the container.

6 Claims, 2 Drawing Sheets

MOVABLE AUXILIARY HOPPER

This invention relates to a movable auxiliary hopper for feeding caps or similar small articles to a stationary hopper or a parts orienting device of an assembly machine, such as a capping machine for bottles.

STATE OF THE ART

Various machines are known for feeding small items from a storage container or hopper to a point of use, such as a nailing machine. One such machine is disclosed in U.S. Pat. No. 1,888,520 which discloses the use of a nail gate for guiding nails in a nailing machine to a point of use, wherein a nail pan containing a charge of nails is oscillated by means of a connecting rod to cause nails to flow down a slotted chute with the head of the nail spanning and engaging the slot and with the body of the nail extending through the slot. In this manner, the nail is fed to the nailing mechanism of the machine for immediate use.

U.S. Pat. No. 2,181,661 discloses a dispensing container for tacks comprising a plurality of containers pivotally mounted on a spindle supported by standards. The containers or casings containing the tacks are accessible to a workman by manually actuating a bumper plate which pivots a casing from a home position to a discharge position causing the tacks to flow by gravity to a discharge gate which opens automatically under the weight of the tacks. When the workman receives the desired number of tacks, he releases the bumper plate which causes the casing to pivot back to its home position.

Other patents for feeding or moving a material from a container or for causing the movement of material from a container to a discharge station include U.S. Pat. No. 2,744,670 and U.S. Pat. No. 3,193,150.

A particular patent of relevance is U.S. Pat. No. 3,905,177 which is directed to a bottle capping machine, the machine comprising a cap feeding mechanism which extends from an elevated stationary hopper to a cap-receiving station. The machine has an endless belt for conveying bottles to a capping station which includes a bottle grasping mechanism and a captightening mechanism. The belt conveyor and associated mechanisms are synchronized to effect sequential placement of a cap on each bottle followed by tightening of the cap by the tightening mechanism located forward of the cap placement means.

A problem which has existed for some time is the loading and unloading of the stationary hopper which is usually located on the machine at a substantial height from the floor. Thus, a worker refilling the hopper or unloading it after an assembly run was generally forced to use a step ladder or other means to obtain access to the interior of the hopper. As will be obvious, this procedure can be time consuming and can also be dangerous if one loses his balance.

One solution to the foregoing problem has been to provide an elevator having a chain of compartments for conveying bottle caps or other articles from a lower level to a higher level sufficient to enable the discharge of the contents thereof into a stationary hopper. One such elevator is described in Bulletin 02-86-02 published by Feed Systems Inc., Riverhead, N.Y., entitled "Bulk Parts Elevator". However, such elevators tend to be bulky and fairly expensive.

According to the invention, a movably mounted auxiliary hopper is provided which is pivotally mounted on a platform portion of the machine which is capable of being displaced from a substantially machine level position or home position to an elevated, discharge position above the stationary hopper of the machine whereby parts, such as caps, can be easily fed to the stationary hopper without requiring the use of a step ladder or an elevator to replenish the stationary hopper.

None of the prior art referred to hereinabove discloses the novel inventive concept disclosed and claimed herein.

OBJECTS OF THE INVENTION

It is thus an object of the invention to provide a movably mounted auxiliary hopper capable of easily being raised from a charging or home position to an elevated discharge position relative to a stationary dispensing hopper or a parts orienting device located on a machine adapted for feeding small parts, such as bottle caps, from said stationary hopper to an assembling station located on a lower part of machine.

Another object of the invention is to provide a movably mounted auxiliary hopper comprising a container having bottom, side and end walls and open at the top, said hopper being pivotally mounted on a platform portion of the machine via a pair of legs pivotally mounted to one side of the container, and a complementary pair of legs pivotally mounted on the other side thereof.

These and other objects will more clearly appear from the following disclosure, the appended claims and the accompanying drawings.

IN THE DRAWINGS

FIG. 1, by way of illustration, is a front elevation view of a bottle capping machine showing the auxiliary hopper pivotally mounted to a platform portion of the machine; and FIG. 2 is a three-dimensional view of one embodiment of an actuating means for raising and lowering the auxiliary hopper as shown.

SUMMARY OF THE INVENTION

Stating it broadly, one embodiment of the invention resides in a combination of a movably mounted auxiliary hopper and a platform therefor for discharging small articles contained in said container to a cooperably associated dispensing hopper or parts orienting device mounted on said platform, said dispensing hopper being adapted to feed said articles in an oriented position to a cooperably associated inclined chute extending downwardly to a receiving station. The term "dispensing hopper" used hereinafter is meant to include a parts oriented device. The hopper is comprised of a container having bottom, side and end walls and an open top for receiving a charge of said small articles therein, the bottom being adapted to provide gravity flow of the articles to a discharge end of said container by being downwardly sloped and/or provided with means to aid gravity, such as vibration means, internally disposed conveyor belt or the like. The container has a U-shaped trough or chute extending from the discharge end of the container which communicates with the interior of the container, and a pair of legs pivotally mounted to one side of the container and a complementary pair pivotally mounted on the other side thereof. The legs extend to and are pivotally connected to the platform, such that the container is capable of being pivotally moved to an upper position for discharging articles to said dispensing hopper and to a lower accessible position for charging articles to or removing residual articles from said container comprising said auxiliary hopper.

DESCRIPTION OF THE PREFERRED EMBODIMENT

Figure 1:
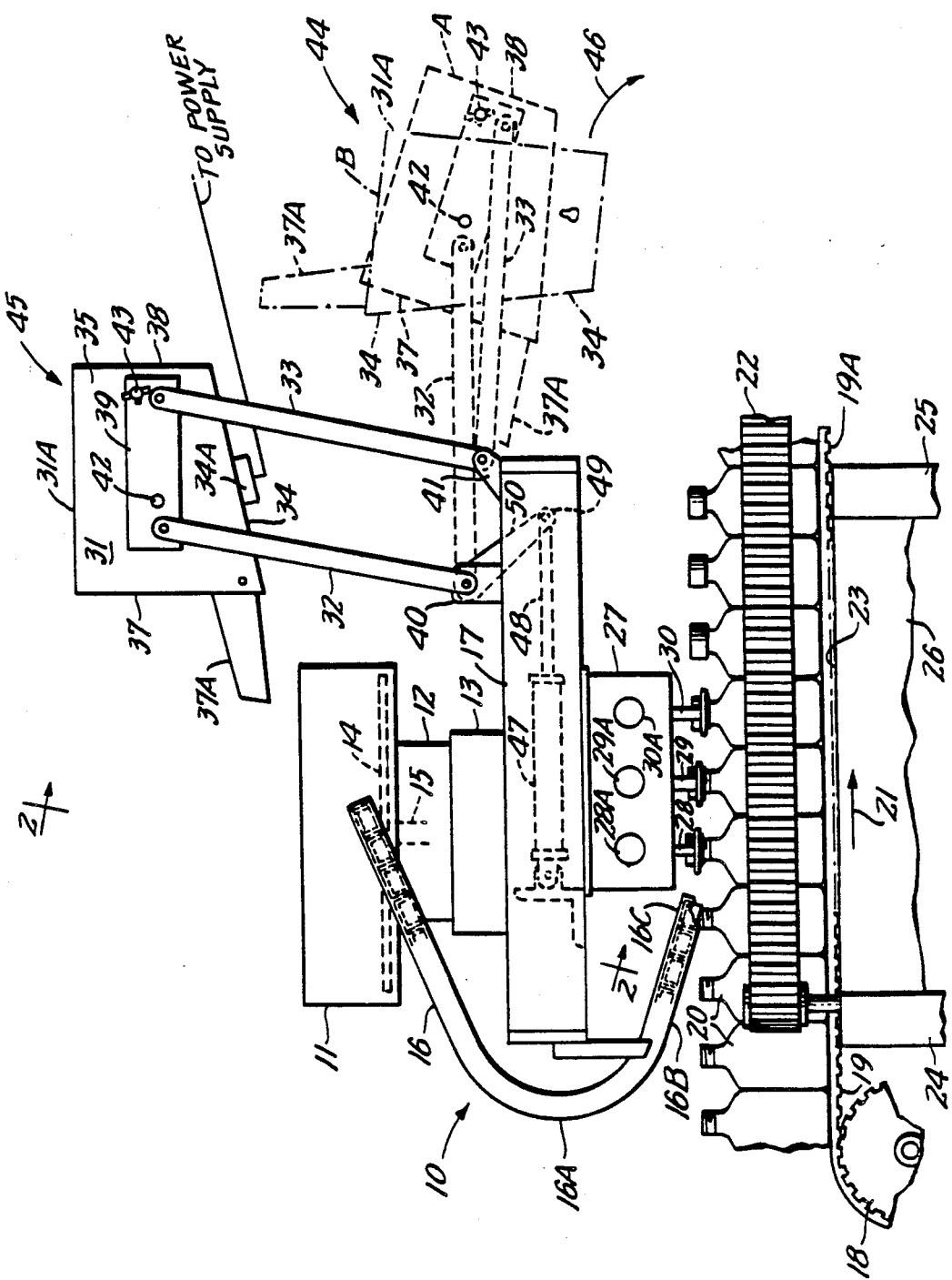

Referring to FIG. 1, a portion of a capping machine is shown indicated generally by numeral 10 of the general type similar to that shown in U.S. Pat. No. 3,905,177 which is incorporated herein by reference. The machine is comprised of a cap feed mechanism comprising in combination a stationary hopper or parts orienting device 11 supported on top of members 12 and 13, said hopper having disposed within it rotatable table 14 axially mounted via shaft 15 extending into member 12, the shaft being rotated by means not shown. The turning of the table enables the orientation of articles, such as caps, for feeding into trough 16 to be discussed later.

The hopper 11 and members 12, 13 are disposed on platform 17 which is supported by vertical standards of the machine not shown. Spaced below the platform is a conveyor belt system comprising a toothed wheel 18 at each end of a horizontal flexible belt 19 which has corresponding teeth 19A on its underside which enables the belt to be driven by spaced tooth wheels 18 operated by a conventional motorized system not shown. The bottles are held in position for capping by opposed side belts 22 shown fragmentarily by FIG. 1. The side belts are adapted to grasp the bottles in unison with the travel of belt 19 along supporting bed 23 formed by vertical support elements 24, 25 and side element 26.

Platform 17 has extending downwardly from it mechanism 27 from which extend spindles 28, 29, 30 having a rotatable rubbercoated disc at one end thereof for bearing on the cap and cooperating with means not shown for screwing the cap on the bottle. (Note U.S. Pat. No. 3,905,177 incorporated herein by reference). Screws 28A, 29A and 30A are provided for positioning or setting said rotatable discs according to the size of the cap.

Figure 2:
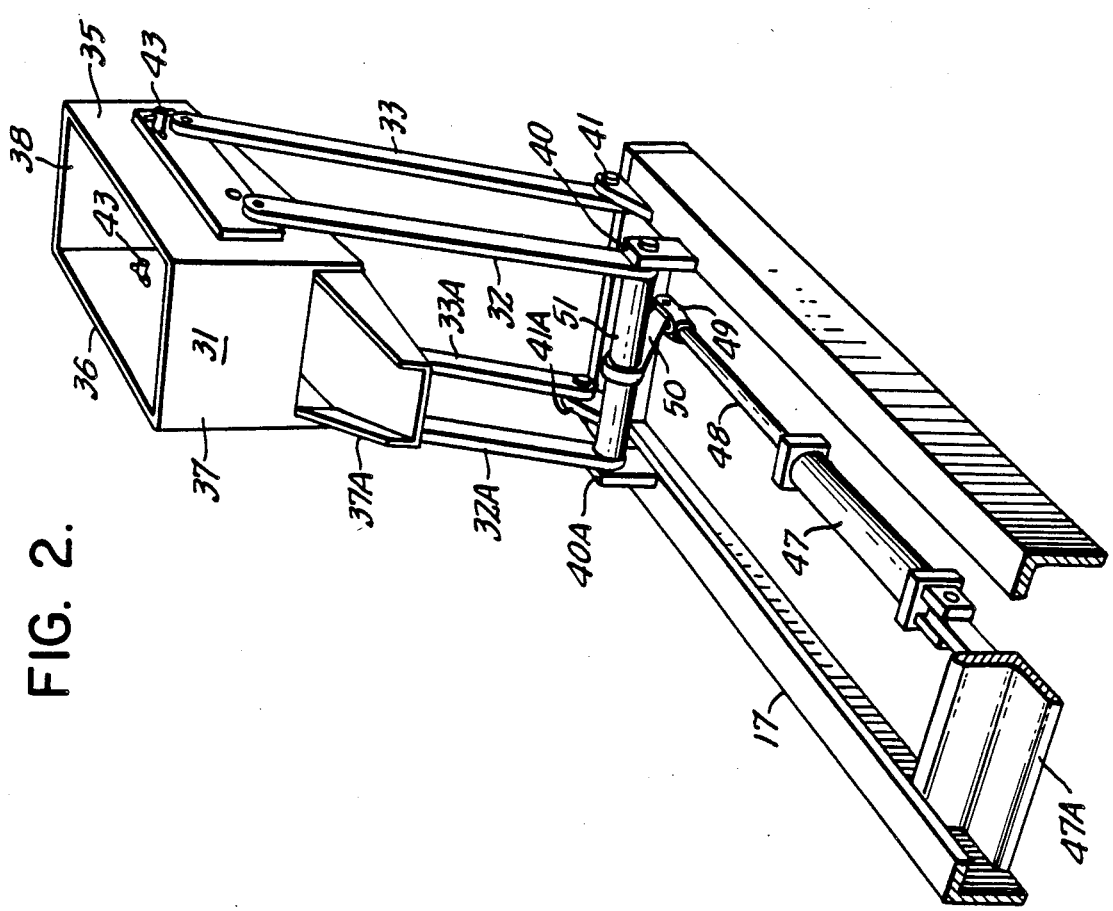

In order to provide ease of accessibility to hopper 11, a pivotally mounted auxiliary hopper 31 is provided mounted to platform 17 as shown by a pair of spaced legs 32, 32A and 33, 33A mounted on each side of the auxiliary hopper 31 as shown more clearly in FIG. 2, which is a three dimensional view of the auxiliary hopper and associated members as viewed in the direction of arrows 2—2 of FIG. 1.

Referring back to FIG. 1, auxiliary hopper 31 preferably has an inclined bottom 34, side walls 35, 36, end walls 37, 38 and open top 31A. End wall 37 has a discharge end which is provided with a trough or chute 37A which communicates with the interior of the auxiliary hopper as shown more clearly in FIG. 2. The bottom 34 may be provided with means 34A, in this case a vibratory means, coupled to a power supply for vibrating the bottom of the hopper to further aid in the gravity flow of parts to hopper 11. Other means may be employed such as a movable belt located at the inner bottom of auxiliary hopper 31.

The pivotally mounted legs are connected via plates 39 to each side 35, 36 of the movable hopper. Legs 32, 32A extend from the forward part of movable hopper 31 to platform 17 and are pivotally mounted thereto via ears 40, 40A, respectively, extending upwardly from platform 17, while legs 33, 33A are pivotally connected to the platform via ears 41, 41A, respectively.

Plates 39 are connected to each side of the movable hopper via a pivot pin 42 and locking pin 43 which is removably connected to each side of the plates 39 and to side walls 35, 36. The locking pin 43 is advantageous in that when it is removed, it enables the further rotation of movable hopper in the down or home position to enable the dumping out of left-over parts or caps as illustrated by arrow 46 of FIG. 1.

Referring to FIG. 1, movable hopper 31 is depicted in two main positions: a home position identified generally by numeral 44 and in the elevated discharge position identified generally by the numeral 45.

There are two parts to the home position: position A with removable pin 43 in place and legs 32, 33 substantially horizontal. In this position (i.e., A position), the auxiliary hopper is ready for receiving an additional charge of articles, e.g., cap to be transported to elevated position 45 for charging stationary hopper 11.

The other home position is position B which is achieved by removing locking pin 43 to cause movable hopper 31 to take a position that enables the dumping out of residual articles or caps from movable hopper 31 as shown by arrow 46.

Various means may be employed for raising and lowering the pivotally mount auxiliary hopper. It may be done manually or by an actuating means, such as a winch (not shown), or as a pneumatically operated piston and rod combination such as the type 47, 48 shown phantomly in FIG. 1 and more clearly in FIG. 2. Referring to FIG. 2, a cylinder 47 is shown anchored to cross member 47A of the platform, the cylinder having confined therein a pneumatically operable piston connected to piston rod 48 which has a yoke-connecting end 49 coupled to a bell crank 50. The bell crank is connected to a rotatable shaft 51 which is connected to pivotally mounted legs 32, 32A. The pneumatic cylinder is operated by compressed air in the usual manner (not shown). By actuating the piston rod 48 rearward of said movable hopper 31, the hopper is caused to take the position depicted in either A or B of FIG. 1 by reversing the direction of piston rod 48, the hopper 31 with a charge of caps is raised to the elevated position 45 shown in FIG. 1.

Although the present invention has been described in conjunction with preferred embodiment, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. The combination of a movably mounted auxiliary hopper a cooperably associated dispensing hopper, and a platform therefor for discharging small articles contained in said auxiliary hopper to said dispensing hopper said dispensing hopper being mounted on said platform and adapted to feed said articles in an oriented position to a cooperably associated chute inclined downwardly to a receiving station, said auxiliary hopper comprising a container having bottom, side and end walls and an open top for receiving a charge of small articles therein, said container being adapted to provide gravity flow of said articles by demand to a discharge end of said container, a U-shaped trough extending from the discharge end of the container and communicating with the interior of said container, a pair of legs pivotally mounted to one side of said container and a complementary pair pivotally mounted on the other side thereof, and locking means disposed on each side of said container cooperably associated with said mounted legs for lockingly supporting said container in one or another of two home positions, said legs extending to and being pivotally connected to said platform, such that the container is capable of being moved to an upper position for discharging articles to said dispensing hopper and to a lower accessible home position for charging articles to or to remove residual articles from said container.

2. The movably mounted auxiliary hopper of claim 1, wherein each side wall of the container has a mounting plate pivotally mounted by a pin at one end on each of said side walls and mounted at its other end by a removable locking pin, said legs of said container being pivotally mounted to said mounting plate, such that when the locking pin is in place, the movably mounted auxiliary hopper is capable of assuming one home position and when the locking pin is disconnected, it is capable of assuming another home position.

3. The movably mounted auxiliary hopper of claim 1, including means for moving said auxiliary hopper from a home position to a discharge position and back to home position, and means to aid in the gravity flow of small articles from the auxiliary hopper to said cooperably associated dispensing hopper.

4. The combination of a movably mounted auxiliary hopper, a cooperably associated dispensing hopper, and a platform therefor for discharging small articles contained in said auxiliary hopper to said dispensing hopper said dispensing hopper being mounted on said platform and adapted to feed said articles in an oriented position to a cooperably associated chute inclined down to a receiving station, said auxiliary hopper comprising a container having bottom, side and end walls and an open top for receiving a charge of small articles therein, said bottom being downwardly sloped to aid in the gravity flow of said articles to a discharge end of said container, a U-shaped trough extending from the discharge end of the container and communicating with the interior of said container, a mounting plate on each side of said side walls, each of said mounting plates being pivotally mounted by a pin at one end thereof to said side wall and mounted at the other end by a locking pin, a pair of legs pivotally mounted to one side of said container via said mounting plate and a complementary pair pivotally mounted to the other side via said other mounting plate, said legs extending to and being pivotally connected to said platform, such that the container is capable of being moved to an upper position for discharging articles to said dispensing hopper and to a lower accessible home position for charging articles to or to remove residual articles from said container, said container being capable of assuming one home position when both pins of said mounting plate are in place and another home position when said locking pin is disconnected.

5. The movably mounted auxiliary hopper of claim 4, including means for moving said auxiliary hopper from a home position to a discharge position and back to home position.

6. The movably mounted auxiliary hopper of claim 4, including means on said hopper to further aid in the gravity flow of said small articles to said dispensing hopper.

* * * * *